Sept. 1, 1936.    F. LANDGRAF    2,052,775
SHOCK ABSORBER FOR AIRCRAFT
Filed July 1, 1935
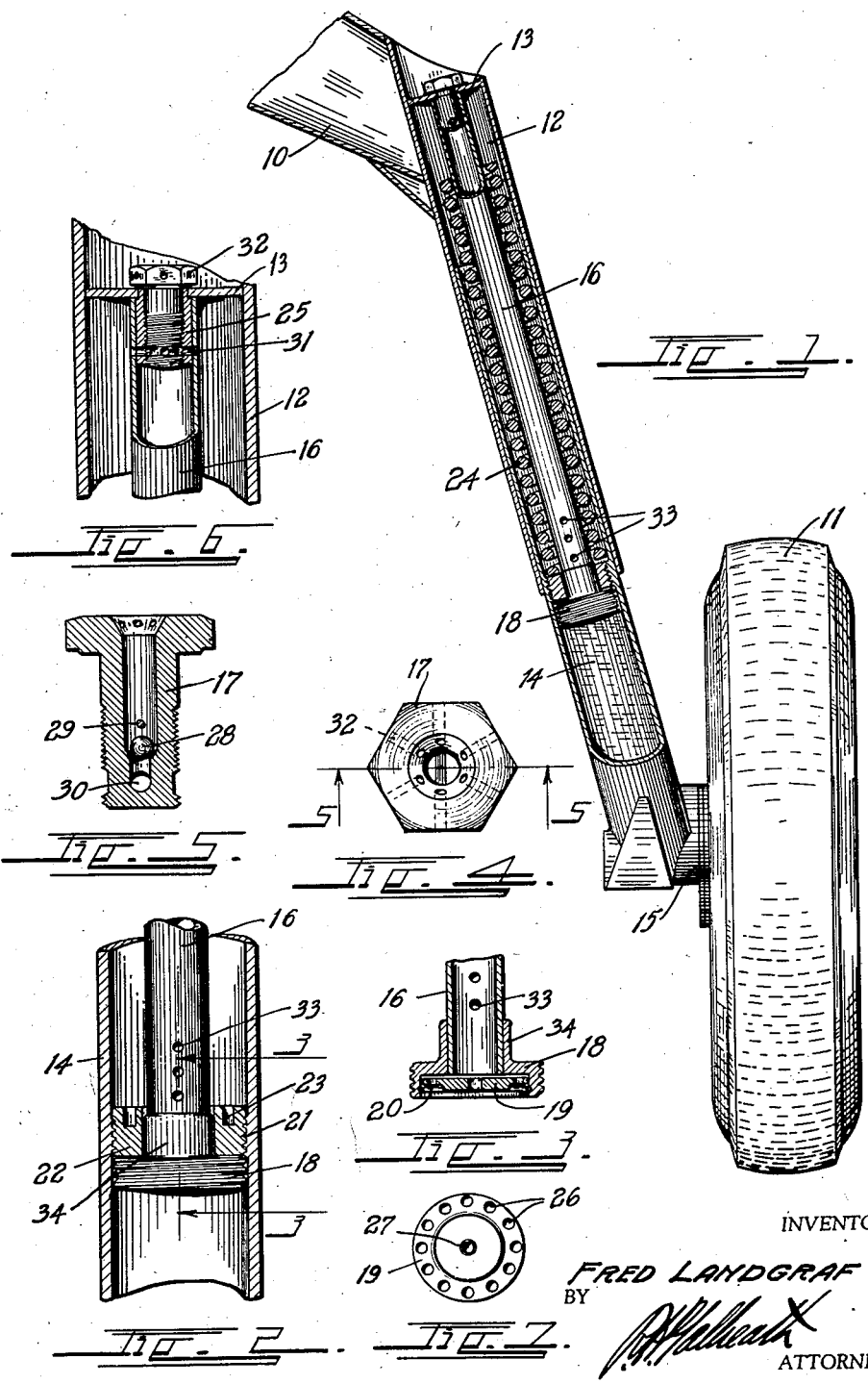
INVENTOR
FRED LANDGRAF
BY
ATTORNEY.

Patented Sept. 1, 1936

2,052,775

UNITED STATES PATENT OFFICE 2,052,775

SHOCK ABSORBER FOR AIRCRAFT

Fred Landgraf, Denver, Colo., assignor to Lewis-American Airways, Inc., Denver, Colo., a corporation of Colorado Application July 1, 1935, Serial No. 29,300

5 Claims. (Cl. 267—34)

This invention relates to a shock absorbing device, more particularly designed to absorb the shock of the landing wheels of an aircraft. The principal object of the invention is to provide a light, compact, highly efficient absorbing device in which the absorption or resistance will gradually increase as the shock increases, and in which all packing, stuffing, boxes, and other devices to prevent fluid leakage are eliminated.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is an assembled sectional view illustrating the device applied to the landing wheel of an aircraft.

Fig. 2 is an enlarged sectional view at the piston of the device.

Fig. 3 is a detail section, taken on the line 3—3, Fig. 2.

Fig. 4 is a detail plan view of the air check valve.

Fig. 5 is a section through the air check valve, taken on the line 5—5, Fig. 4.

Fig. 6 is a detail enlarged section through the upper portion of the cylinder.

Fig. 7 is a detail face view of the check valve plate.

In Fig. 1, a portion of a typical landing gear of an aircraft is indicated at 10 and one of the landing wheels is illustrated at 11 with its axle support at 15.

The landing gear 10 carries a downwardly projecting outer cylinder 12 which is open at its bottom, and closed at its top by means of a head plate 13. An inner cylinder, which will be herein designated the piston cylinder 14, is secured to the axle member 15 of the landing wheel 11. The piston cylinder 14 is closed at its bottom and is open at its top and is of a diameter to fit snugly within the outer cylinder 12.

A hollow piston tube 16 is secured to the head plate 13 by means of a threaded check valve housing 17. The lower extremity of the piston tube 16 terminates in a threaded piston 18. Ports 33 are formed in the tube 16 adjacent the bottom thereof.

At a point on the interior surface of the piston cylinder 14, inwardly projecting threads 21 are formed into which a partition bushing 22 is threaded. The bushing 22 is provided with wrench sockets 23 to facilitate its insertion. A compression spring 24 rests upon the partition bushing 22 and normally terminates below the head plate 13, as shown in Fig. 1.

In assembling the device the piston 18 is first placed in the cylinder 14 and rotated to thread it past and below the threads 21. The bushing 22 is then dropped into the cylinder 14 about the piston rod 16 and threaded tight into the threads 21. The threads on the bushing terminate below its top so that it can not thread past the threads 21. The spring 24 is then placed about the tube 16, and the entire assembly is forced upwardly into the cylinder 12. The check valve housing 17 is then threaded into the top of the piston tube to hold the entire assembly in place. A threaded bushing 25 is welded, brazed, or otherwise secured in the top of the piston tube 16 to receive the valve housing 17.

A check valve plate 19 is held in the piston 18 by means of a spring ring 20. This plate is formed with an annular series of perforations 26 adjacent its edge and a central perforation 27.

The check valve housing 17 contains a check valve ball 28 which prevents inflow into the housing. The ball is retained in the housing by means of a suitable cross pin 29. Ports 30 are formed below the valve ball 28 which communicate with passages 31 through the piston rod 16. The head of the valve housing is drilled radially as shown at 32 to receive a cotter key or locking wire to prevent accidental unscrewing of the housing.

In use, the lower part of the piston cylinder 14 is filled with oil or other suitable fluid. While the aircraft is in the air, so that there is no weight on the landing wheel 11, the parts will be in the position illustrated in Fig. 1. When the landing wheel first contacts with the ground, the piston cylinder 14 will be pushed into the cylinder 12. This forces oil from the lower portion of the cylinder 14 through the ports 26 and 27 in the check valve plate 19 into the hollow piston tube 16. From thence, the oil flows through the ports 33 into the cylinder 12.

As the pressure on the wheel increases, the flow of oil will force the check valve plate 19 against its seat in the piston 18 so as to close the perforations 26 and restrict the flow to the single perforation 27 which increases the resistance or absorbtion, and allows the cylinder 14 to move upwardly more slowly until the spring 24 contacts with the head 13. At this time, the resistance of the spring will be added to the resistance of the oil so as to absorb the maximum shock.

The oil flowing into the cylinder 12 will compress air in the upper part thereof. This air will exit through the ports 31 and passages 30 past the check ball 28. When the cylinder 14 moves downward on the rebound, the ball 28 will close so as to produce a partial vacuum in the cylinder 12. This vacuum will draw air inwardly between the two cylinders so as to remove any extruded oil from between the cylinders and prevent leakage about the cylinder 14. This eliminates the necessity for packing to prevent oil leakage.

A sleeve 34 surrounds the piston tube adjacent the piston 18. The opening in the bushing 22 fits snugly about this sleeve. When the tube 14 is dropping to the bottom on a rebound the oil will flow from the upper cylinder through the bushing about the piston tube. As the bottom is approached the sleeve 34 will restrict the bushing opening to check the returning oil and provide a rebound cushion. The threads about the piston 18 serve as oil sealing grooves.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A shock absorber for aircraft comprising: a first downwardly extending open bottomed cylinder; means for securing said cylinder to said aircraft; a second upwardly extending open topped cylinder; means for securing said latter cylinder to a landing wheel; a head in said first cylinder; a piston tube extending downwardly within said cylinders from said head; a piston on the lower extremity of said piston tube closing said second cylinder; a partition plate surrounding said piston tube above said piston, said piston tube being hollow and provided with passages communicating with the interior of said first cylinder; a check valve in said piston controlling the flow from said second cylinder to said piston tube; and a check valve in said first cylinder to allow air to exhaust therefrom.

2. A shock absorber for aircraft comprising: a first downwardly extending open bottomed cylinder; means for securing said cylinder to said aircraft; a second upwardly extending open topped cylinder; means for securing said latter cylinder to a landing wheel; a head in said first cylinder; a piston tube extending downwardly within said cylinders from said head; a piston on the lower extremity of said piston tube closing said second cylinder; a partition plate surrounding said piston tube above said piston; a compression spring surrounding said piston tube between said partition plate and said head; and means for creating a partial vacuum in said first cylinder.

3. A shock absorber for aircraft comprising: a first downwardly extending open bottomed cylinder; means for securing said cylinder to said aircraft; a second upwardly extending open topped cylinder; means for securing said latter cylinder to a landing wheel; a head in said first cylinder; a piston tube extending downwardly within said cylinders from said head; a piston on the lower extremity of said piston tube closing said second cylinder; a partition plate surrounding said piston tube above said piston, said piston tube being hollow and provided with passages communicating with the interior of said first cylinder; a check valve in said piston controlling the flow from said second cylinder to said piston tube; a check valve in said first cylinder to allow air to exhaust therefrom; and a compression spring surrounding said piston tube between said partition plate and said head.

4. A shock absorber for aircraft comprising: a first downwardly extending open bottomed cylinder; means for securing said cylinder to said aircraft; a second upwardly extending open topped cylinder; means for securing said latter cylinder to a landing wheel; a head in said first cylinder; a piston tube extending downwardly within said cylinders from said head; a piston on the lower extremity of said piston tube closing said second cylinder; a partition plate surrounding said piston tube above said piston; said piston tube opening through said head; a valve housing in the upper extremity of said piston tube; and a check valve in said housing to allow exit of air from said first cylinder and to prevent return of air thereto.

5. A shock absorber comprising: two tubes, each open at its one extremity and closed at its other extremity, the open extremity of the second tube fitting snugly into the open extremity of the first tube so that their walls are in slidable contact throughout their length; a partition intermediate the extremities of said second tube; a piston tube extending from the closed extremity of said first tube through said partition and terminating in said second tube; a piston on the latter extremity of said piston tube; a restricted passage between the interiors of said tubes through said piston tube; a compression spring surrounding said piston tube and positioned above the partition and within said second tube; a fluid in said second tube; and means for allowing air to escape from said first tube as the fluid enters from said second tube but preventing air from returning so as to create a vacuum therein to prevent leakage between said slidably contacting tubes.

FRED LANDGRAF.